United States Patent [19]

Wiskirchen

[11] 4,123,870
[45] Nov. 7, 1978

[54] FISHHOOK

[76] Inventor: Edward L. Wiskirchen, 8273 Sandy Ridge Rd., Kewaskum, Wis. 53040

[21] Appl. No.: 786,347

[22] Filed: Apr. 11, 1977

[51] Int. Cl.² ........................................... A01K 85/00
[52] U.S. Cl. .................... 43/42.37; 43/42.39
[58] Field of Search ........................... 43/42.37, 42.39

[56] References Cited

U.S. PATENT DOCUMENTS

| 1,497,019 | 6/1924 | Hennings | 43/42.37 |
| 3,465,466 | 9/1969 | Showalter | 43/42.37 X |
| 3,863,378 | 2/1975 | Walker | 43/42.37 |
| 3,909,974 | 10/1975 | Kent | 43/42.37 |

Primary Examiner—Harold D. Whitehead
Attorney, Agent, or Firm—Michael, Best & Friedrich

[57] ABSTRACT

The fishhook is provided with a lead sinker cast around the shank of the hook and which incorporates two small sharp barbs projecting laterally adjacent the shank of the sinker. Nightcrawler is impaled on the hook in the normal manner but with the nightcrawler impaled on the barbs thereby more firmly securing the nightcrawler to the hook. It has been found that with this arrangement the nightcrawler can be cast for a considerably longer period of time without losing the nightcrawler.

4 Claims, 2 Drawing Figures

U.S. Patent    Nov. 7, 1978    4,123,870
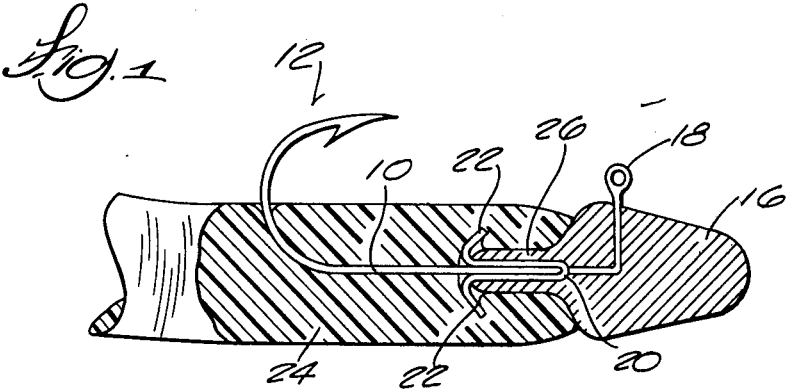
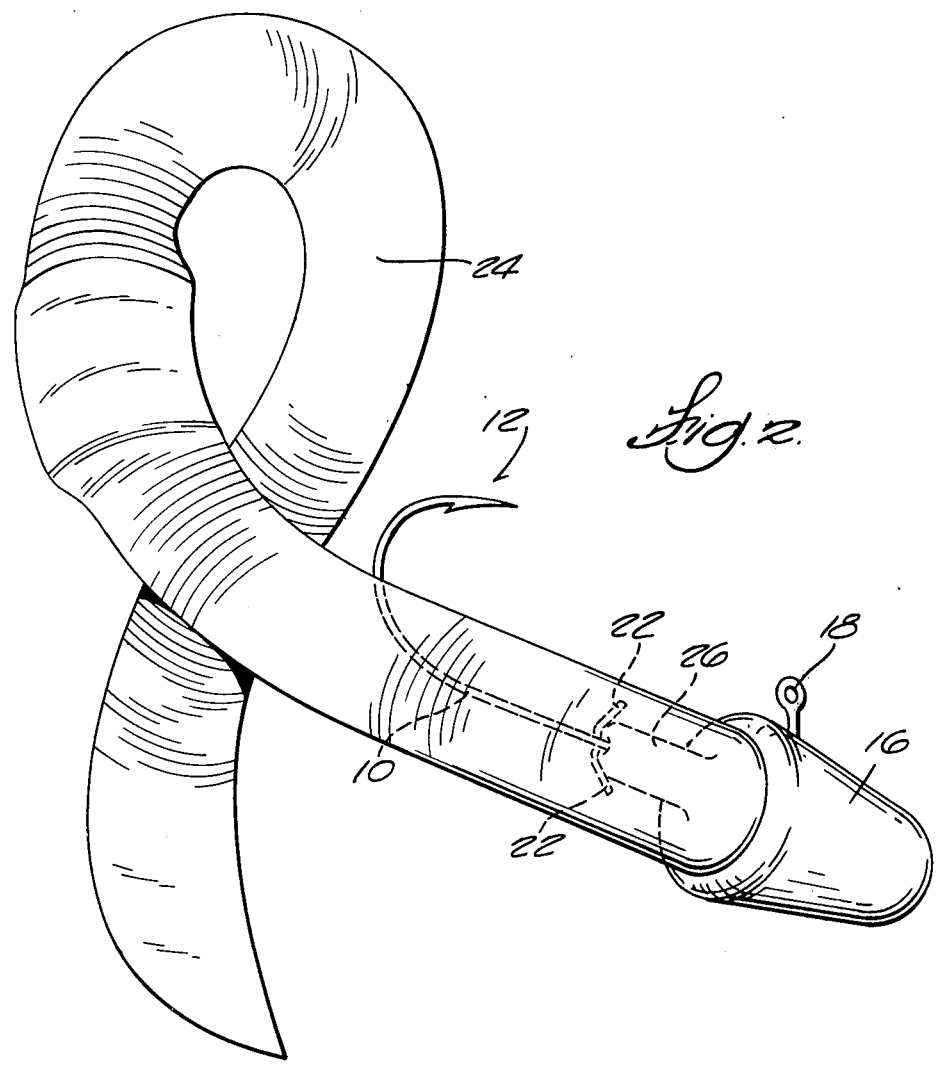

FISHHOOK

BACKGROUND OF THE INVENTION

Normally if one tries to cast a nightcrawler the wear and tear on the nightcrawler is appreciable and before long the nightcrawler has been lost. Impaling the nightcrawler a large number of times on the hook is counterproductive since the nightcrawler then cannot extend itself to an enticing length and the damage done by the multiple passage of the hook through the nightcrawler greatly shortens the useful life of the worm as bait.

DESCRIPTION OF THE PRIOR ART

The prior art shows various multiple hook configurations which are for different purposes than the present invention. In the present invention barbs are provided upon which the worm is impaled whereas the prior art with the multiple hooks the bait must be impaled on each hook by the fisherman. Examples of the prior art are found in U.S. Pat. Nos. 2,756,536, 3,465,466.

SUMMARY OF THE INVENTION

The purpose of this invention is to provide a fishhook having an integral sinker to facilitate casting a worm without rapid loss of the worm. To prevent the loss, the barbs are embedded in the lead cast sinker and are positioned so the worm is impaled on the barbs without extensive damage to the worm.

FIG. 1 is a cross section through the fishhook made according to the present invention; and FIG. 2 is a perspective view showing the manner in which a worm may be impaled on the present hook.

DESCRIPTION OF THE PREFERRED EMBODIMENTS

Shank 10 of fishhook 12 is bent at a right angle at 14 to permit lead sinker 16 to be cast on the shank with the eyelet 18 projecting to one side of the sinker. Prior to the casting of the sinker a wire is bent in the middle at 20 and is mounted to project along the shank 10 of the hook. After the sinker has been cast the exposed ends 22 of the wire are bent outwardly and somewhat forwardly towards the front of the sinker. Cutting the wire leaves sharp ends on the wire. Thus, when a worm 24 is impaled on the hook 12 as shown in FIG. 2, it is impaled on the exposed sharp barbs 22 without the barbs passing through the worm. Since the hook now does not pull sideways on the worm, the worm is not "cut in half."

With the present fishhook it is possible to cast a worm for a considerable period of time without loss of the worm. The improvement relative to normal casting of a nightcrawler is considerable. The usual nightcrawler technique results in a considerable loss of worms with undesired feeding of the fish.

It will be noted the barbs face towards the "front" of the assembly so that water pressure during retrieval tends to hold the worm on the barbs. If the barbs face rearwardly towards the hook the water pressure would tend to pull the worm off the barbs. The neck 26 on the lead sinker serves to capture the wire (the ends of which form the barbs) and is thin enough to permit the barbs to be bent towards the front and have enough clearance between the barbs and the main sinker body to allow movement of the worm.

While the principal purpose of this design is to improve the retention of live night crawlers the design is also of utility in more firmly anchoring plastic night crawlers. Plastic worms are customarily molded over a hook and the plastic can tear free of the hook. With the present design the front of the plastic worm is molded over the barbs with the shank of the hook embedded in the worm. Thus the molded-on worm appears the same as a live worm. The barbs give added anchorage for the plastic and increase the useable "life" of the plastic worm. Live worms are generally more productive than plastic and for that reason the primary use of this design is with live worms.

I claim:

1. A fishhook for use in casting worms and the like comprising
    a barbed hook having a bent shank and an eyelet on the end of the shank
    a lead sinker cast around the bent shank with the eyelet of the hook shank projecting laterally from the lead sinker, and
    a barb projecting laterally from the cast sinker adjacent the shank of the hook along the portion of the shank between the hook and the bend in the shank, said barb including a wire portion which is adjacent and generally parallel to the shank of the hook and is imbedded in and retained by the lead sinker.

2. A hook according to claim 1 in which the barb projects forwardly toward the front of the sinker and away from the hook.

3. A hook according to claim 2 in which the lead sinker includes a neck portion and the barb comprises the end of a wire bent to lie along the hook shank in said neck portion.

4. A hook according to claim 3 in which there are two barbs projecting in opposed directions and formed of a single wire having two portions adjacent said shank and connected by a reverse bend.

* * * * *